United States Patent [19]

Lloyd-Williams

[11] Patent Number: 5,007,001

[45] Date of Patent: Apr. 9, 1991

[54] METHOD FOR REORDERING THE PIXEL MAP OF A DIGITIZED IMAGE

[76] Inventor: Andrew Lloyd-Williams, 6 High View Dr., High Bridge, N.J. 08829

[21] Appl. No.: 469,340

[22] Filed: Jan. 24, 1990

[51] Int. Cl.$^5$ .............................................. G06F 3/14
[52] U.S. Cl. ..................................... 364/518; 382/56; 358/426
[58] Field of Search ....................... 364/518, 521, 522; 382/47, 56; 358/426

[56] References Cited

U.S. PATENT DOCUMENTS 4,698,689 10/1987 Tzou .................................. 382/56 X
4,797,944 1/1989 Tanaka .................................. 382/56
4,868,764 9/1989 Richards .......................... 382/56 X Primary Examiner—David L. Clark

[57] ABSTRACT

A method for reordering the pixel map of a multi-dimensional image by representing each pixel address as a unique set of coordinates in binary represntation, reversing the bit order for each coordinate, interleaving the binary digits of the numbers thus formed from each coordinate in a consistent bit-by-bit fashion, and using the composite binary number thus formed as a new pixel sequence number; storage and/or subsequent transmission of pixel values then takes place in order of ascending pixel sequence numbers, omitting numbers representing pixels outside the limits of the selected image.

20 Claims, 6 Drawing Sheets

METHOD FOR REORDERING THE PIXEL MAP OF A DIGITIZED IMAGE

FIELD OF THE INVENTION

The present invention relates to digital image processing methods and more particularly to methods for the efficacious point-to-point transmission of images, or portions thereof.

DESCRIPTION OF THE PRIOR ART

Although there are many methods for the manipulation of images in the prior art, none is known which teaches or suggests the method of the present invention.

SUMMARY OF THE INVENTION

It is an object of the present invention to reorder the pixel map of a multi-dimensional image in such a way that the new pixel order approximates to a situation in which any contiguous subset of the reordered pixel map equally represents all regions of the image, with broader detail being represented first, followed by increasingly fine detail.

It is another object of the present invention to provide an efficient method for the desired reordering of the pixel map without limit to the overall dimensions of the selected image, and within the constraints of the available random access memory in a given processor.

It is another object of the present invention to provide a method for inverting this procedure, specifically to determine the correct pixel coordinates for each successive pixel in the reordered pixel map, such that minimal processing is required to facilitate rapid display of an image represented by a reordered pixel map.

It is another object of the present invention to provide a method for the storage and transmission of an image with a given set of overall pixel dimensions, and display of the image with different pixel dimensions more appropriate to the equipment on which the image is being displayed; transmission being terminated on an appropriate exchange between the stations following operator request, or when the receiving station is no longer able to display further resolution.

It is another object of the present invention to provide a method by which a transmitted image may be displayed as it is received, and an operator at the receiving station may select a sub-area of the overall image for immediate enlargement; transmission of the overall image continuing while only the sub-area is displayed, or by means of an appropriate exchange of information with the sending station, subsequent transmission being restricted to the sub-area in order to accelerate reception of detail pertaining to that sub-area; so long as transmission of the overall image continues without such restriction, the operator being able to restore immediate display of the overall image and to select a different sub-area for enlargement; such a procedure being iterative, with the possibility of repeated enlargement of a sub-area and/or restricted subsequent transmission, limited only by the available resolution of the pixel map of the image.

It is another object of the present invention to provide a method of concurrent transmission of multiple image files, each representing a rectangular, contiguous section of a larger image, such as a geographical map, providing the receiving station with the ability to select any sub-area of the image represented by the total collection of such files, to enlarge the display of this sub-area, and to repeatedly refine the process up to the maximum available resolution, without transmission of redundant information.

It is another object of the present invention to provide an effective method of compacting the data representing the reordered pixel map in order to reduce required storage, to accelerate display of the image and to reduce overall transmission time, without significant loss of detail.

It is another object of the present invention to provide a method of rapid archiving of older or lesser used image files by a simple truncation of the file with consequent loss of detail, but without total loss of any part of the original image.

DESCRIPTION OF PREFERRED EMBODIMENTS OF THE INVENTION

The problem considered here is that of translating a two-dimensional rectangular grey-scale still image presently stored in line-by-line format with N lines, each containing data representing M pixels into an output stream reordered according to the present invention. The position of any pixel in the image is represented by coordinates (X,Y) where X may take values from 0 through $M-1$, and Y may take values from 0 through $N-1$.

The maximum number of binary bits required to represent the X dimension is determined as m, where m is the smallest number such that $2^m > = M$, and the maximum number of binary bits required to represent the Y dimension is determined as n, where n is the smallest number such that $2^n > = N$.

In the preferred embodiment, the coordinates (X,Y) are converted into alternate orthogonal coordinates (Z,Y), where Z represents the bit-wise logical 'EXCLUSIVE OR' between X and Y, limiting Z to the least significant m bits.

Z and Y are then represented as binary numbers:

$$Z_{m-1} Z_{m-2} Z_{m-3} \ldots Z_2 Z_1 Z_0$$

$$Y_{n-1} Y_{n-2} Y_{n-3} \ldots Y_2 Y_1 Y_0$$

where $Z_i$ and $Y_i$ represent bits having value 0 or 1, and $Z_0$ and $Y_0$ are the least significant bits.

Figure 1:
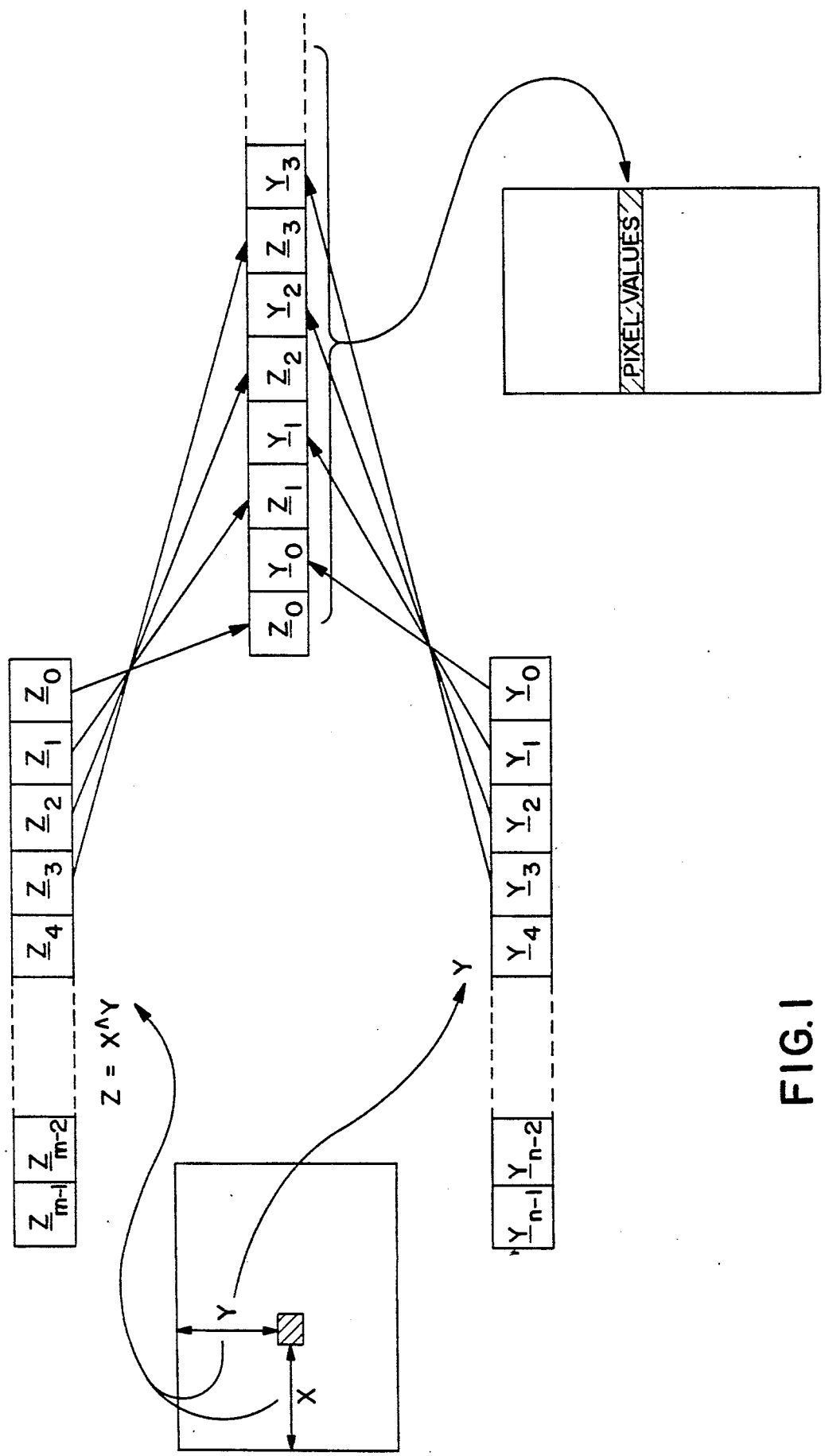
FIG. 1 is a chart showing the method of converting two-dimensional pixel coordinates to a pixel sequence number in accordance with the present invention.

Referring now to FIG. 1, the derivation of the new pixel sequence number is described. The numbers, $Z$ and $Y$ are bit-wise reversed to give:

$$Z_0 Z_1 Z_2 \ldots Z_{m-3} Z_{m-2} Z_{m-1}$$

$$Y_0 Y_1 Y_2 \ldots Y_{n-3} Y_{n-2} Y_{n-1}$$

and interleaved to give the pixel sequence number defined by the resulting stream of binary digits:

$$Z_0 Y_0 Z_1 Y_1 Z_2 Y_2 \ldots Z_{m-2} Y_{n-2} Z_{m-1} Y_{n-1}$$

where $m$ and $n$ are equal, $$Z_0 Y_0 Z_1 Y_1 \ldots Z_{n-2} Y_{n-2} Z_{n-1} Y_{n-1} Z_n Z_{n+1} \ldots Z_{m-2} Z_{m-1}$$

where $m$ is greater than $n$, or $$Z_0 Y_0 Z_1 Y_1 \ldots Z_{m-2} Y_{m-2} Z_{m-1} Y_{m-1} Y_m Y_{m+1} \ldots Y_{n-2} Y_{n-1}$$

where $m$ is less than $n$.

A random access memory buffer is then set aside of sufficient size to hold $2^b$ sets of pixel attribute data, where $b$ may be selected to match the available memory.

If $b$ is greater than or equal to $m+n$, the translation may take place with a single pass of the original image data stream. In the simplest embodiment, the memory buffer is initialized to values not corresponding to useable pixel data. As each set of pixel attribute data is read from the input stream, its (X,Y) coordinates are converted to a pixel sequence number as described above, and the pixel attribute data is stored at the location in the memory buffer corresponding to the pixel sequence number. When the entire original image data stream has been read, transmission is commenced or a new file opened with a header that includes the overall dimensions of the original image, and other information required to interpret the data that follows. The pixel attribute data within the buffer is then transmitted or output to the new file in ascending order of location within the buffer, omitting any locations that have not been changed since initialization.

Figure 2:
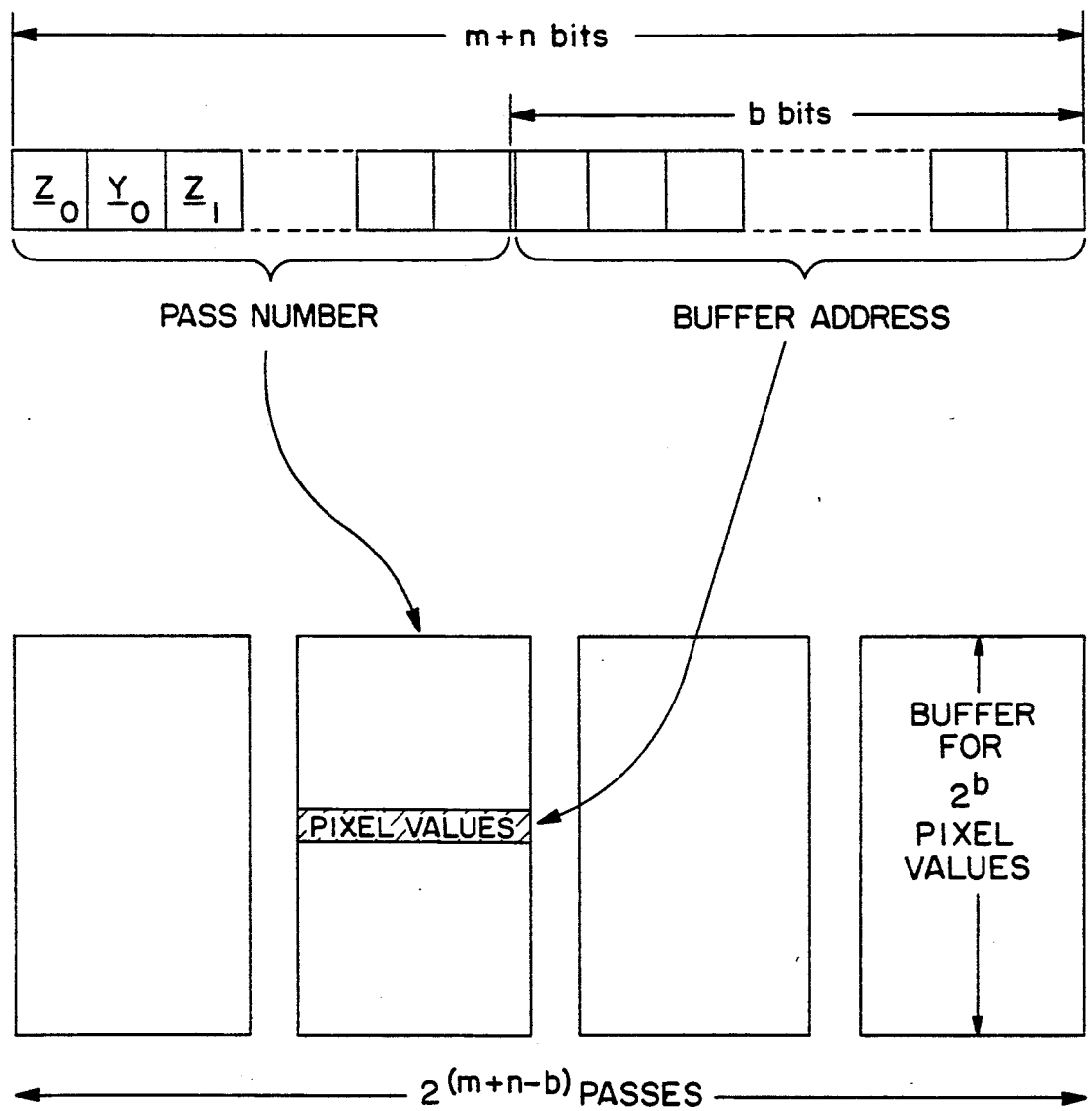
FIG. 2 is a chart showing how the reordering of the pixel data is accomplished using a random access memory buffer of limited size in accordance with the present invention.

If $b$ is less than $m+n$, then it is necessary to perform multiple passes of the original image data stream in order to complete the translation. Referring now to FIG. 2, the translation process is described:
Suppose that:

$$d = (b - (m+n))/2$$

and that:

$$c = b - (m+n) - d$$

such that $c$ is either equal to $d$, or is one greater than $d$.

A mask for $Z$ is then constructed to clear all but the $c$ least significant bits, and a mask for $Y$ is constructed to clear all but the $d$ least significant bits:

$$M_Z = 2^c - 1$$

$$M_Y = 2^d - 1$$

Then $2^{c+d}$ passes of the original image data stream will be required, with test values $T_Z$ and $T_Y$ established for each pass.

The test values, $T_Z$ and $T_Y$ are established for each pass, starting with pass 0, by taking a $(c+d)$-bit binary representation of the pass number, separating alternate bits into two streams, with the most significant bit of the pass number being allocated to $T_Z$ and then reversing the bit streams to obtain the respective values for $T_Z$ and $T_Y$. Thus, if the pass number is $P$ and is represented as a series of binary digits:

$$P_{c+d-1} P_{c+d-2} \ldots P_2 P_1 P_0$$

where $P_0$ is the least significant bit, then $$T_Z = P_1 P_3 P_5 \ldots P_{c+d-5} P_{c+d-3} P_{c+d-1}$$

$$T_Y = P_0 P_2 P_4 \ldots P_{c+d-6} P_{c+d-4} P_{c+d-2}$$

where $c$ is equal to $d$, or $$T_Z = P_0 P_2 P_4 \ldots P_{c+d-5} P_{c+d-3} P_{c+d-1}$$

$$T_Y = P_1 P_3 P_5 \ldots P_{c+d-6} P_{c+d-4} P_{c+d-2}$$

where $c$ is one greater than $d$.

The masked values of $Z$ and $Y$ for each successive pixel are then compared to the test values for each pass in turn and the pixel attribute data is ignored during that pass unless the masked value is equal to the test value for both $Z$ and $Y$ coordinates; that is, unless:

$$(Z \,\&\, M_Z) = T_Z \text{ and}$$

$$(Y \,\&\, M_Y) = T_Y$$

where '&' represents a bit-wise logical 'AND'.

Where pixel data is read from the input stream on a line-by-line basis, this results in the skipping of complete lines of data when the Y match is unsuccessful, and of individual pixels within lines when the Z match is unsuccessful. This skipping is regular and periodic, and lends itself to an efficient program loop for processing.

Transmission is commenced or a new file opened with a header that includes the overall dimensions of the original image, and other information required to interpret the data that follows. The random access memory buffer must be initialized before each pass, and the appropriate memory location is determined as for a single pass, but using only the $b$ least significant bits of the memory location thus determined. Then, at the end of each pass of the original image data stream, the pixel attribute data within the buffer is transmitted or appended to the new file in ascending order of location within the buffer, omitting any locations that have not been changed since initialization.

Where it is not possible to initialize the memory buffer to an unused pixel attribute value, a separate table may be maintained with a one-bit entry for each pixel data location indicating whether any data has been entered in that location. Alternately, the memory buffer may be initialized to some value in use, and a test performed whenever that value is encountered to determine whether it represents valid data or an uninitialized location.

Figure 3:
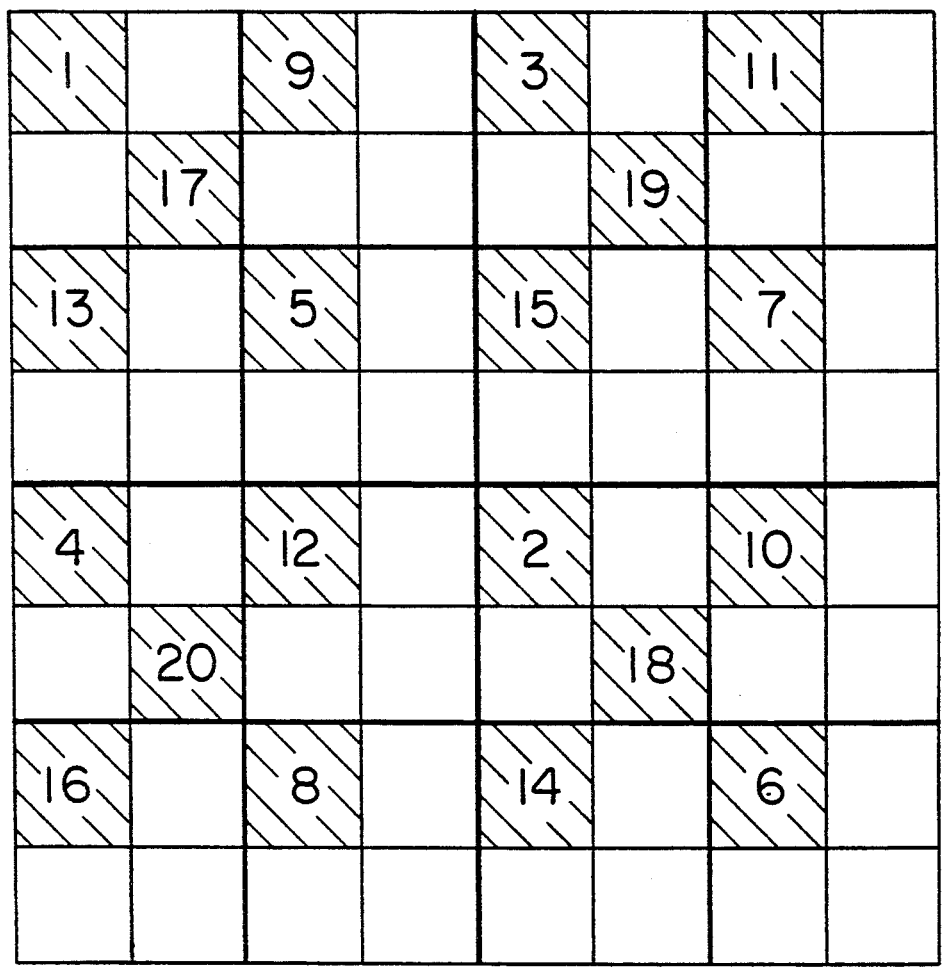
FIG. 3 is a chart showing the inverse relationship between pixel sequence order and the position of each pixel in the display for square images with dimensions equal to a power of 2 according to the present invention.
Figure 4:
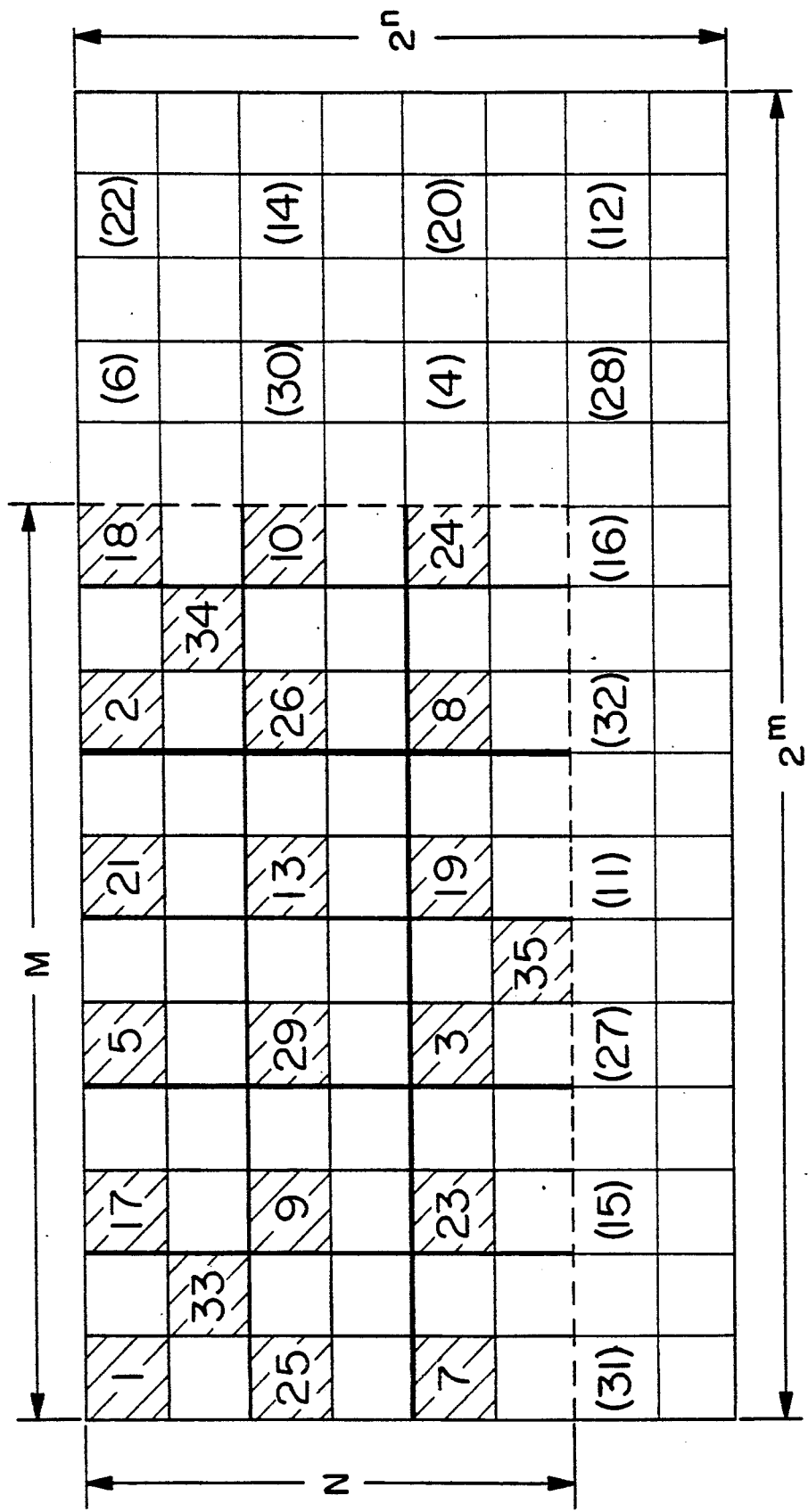
FIG. 4 is a chart showing the inverse relationship between pixel sequence order and the position of each pixel in the display for images of unequal dimensions, which are not necessarily powers of 2 according to the present invention.
Figure 5:
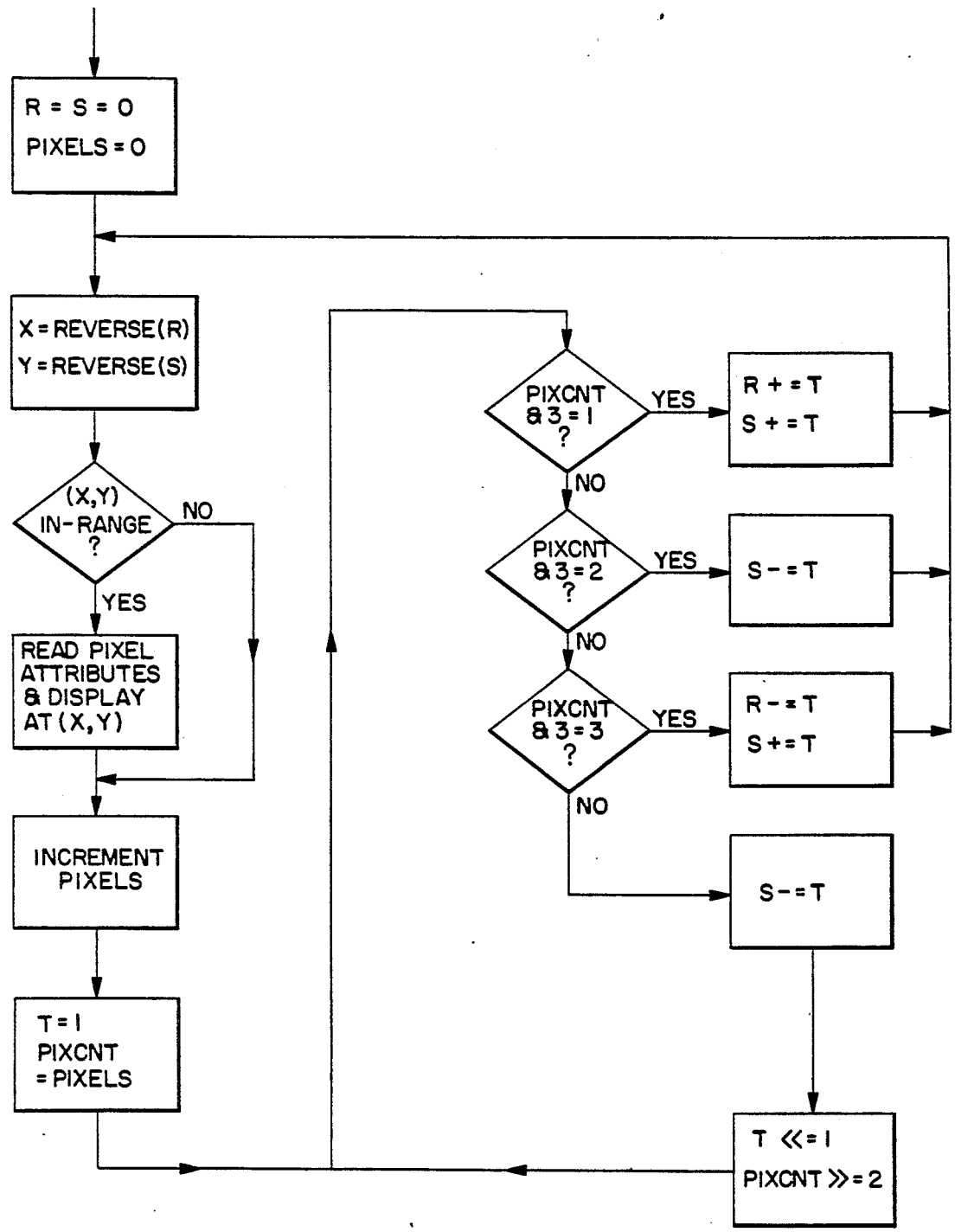
FIG. 5 is a flow diagram of the procedure for display of an image represented in the form of a reordered pixel map of the method of the present invention.

Referring now to FIG. 3 and to FIG. 4, the method of displaying an image from a file containing pixel data reordered according to the present invention, or from a similarly reordered incoming data stream is described:

Referring now to FIG. 5, two counter values, R and S are initialized to zero, each having an equal number of bits sufficient to represent the largest value of X or Y encountered in the original image. For each set of (R,S) values, an appropriate display location is calculated by a bit-wise reversal of R and S to determine the X,Y display location. A predetermined look-up table is used for this bit-wise reversal to speed processing and to provide scaling if required. If X and Y, thus determined, are within the range of the original image, the next set of pixel attribute data is read and written to the display as a point at location (X,Y).

Following each such determination of values for X and Y, a new set of values for R and S are determined. The method of determining R and S is described:

The pixel sequence number is incremented by one and copied to a counter, PIXCNT, and a step value, T is set to one. The lower two bits of PIXCNT are then used as a pointer to one of the following cases:

Case 1: Add T to both R and S, and continue.
Case 2: Subtract T from S, and continue.
Case 3: Subtract T from R and add T to S, and continue.
Case 0: Subtract T from S. Double T. Shift PIXCNT two bits to the right and using the lower two bits of the new value as a pointer, repeat one of the above four cases.

If the binary representations of the dimensions of the original image require a different number of bits (i.e. m and n are different), a further test may be performed to omit values that would correspond to out-of-range values for X or Y, without the need to perform the bit-reversal stage.

The following subroutine, written in the 'C' language is assumed to be available:

```
/* Initialize variables */
R=0; S=0;                        /* Counters for Z,Y dimensions   */
pixels=0;                        /* Pixel Sequence Number         */
Zmask=0; Ymask=0;                /* Z,Y masks to skip lines ...   */
if(n>m) Zmask=(1<<(n-m))-1;      /* ... when m !=n                */
if(n>m) Ymask=(1<<(m-n))-1;
M<<=scale;                       /* Scale image if required       */
N<<=scale;
/* Set up table look-up to reverse bits ...   */
/* ... and to provide scaling as required.    */
/* This is shown here as scaling by a power of 2, but other scaling
      factors can be used        */
base=1<<max(m,n);
a=reverse[0]=0;
for(  i=1; i < base; i++ )
    { b=base+scale;
        do
            {  b>>=1;
               a  =b;
            } while(b && !(a&b));
        if( !  (reverse[i]=a) ) break;
    }
resolution=i;
do
    {  if(  (X=reverse[R])        /* Check within X range         */
               <M &&
            (Y=reverse[S])        /* and within Y range           */
               <N )
            { if(get pixel        /* Only read data for ...       */
                data() == EOF)
              break;              /* ... points in-range          */
              display(X,Y);       /* and display at (X,Y)         */
            }
        T=1; pixcnt=++pixels;
        do
            { switch((int)(pixcnt&3))
                        {  case 1:    R+=T6;    S+=T; break;
                           case 2:              S-=T; break;
                           case 3:    R=T;      S+=T; break;
                           case 0:              S-=T;
                                      T<<=1;
                                      pixcnt>>=2;
                           /* Some changes to the
                              above instructions
                              will be required
                              if a different set of
                              orthogonal co-
                              ordinates are used.              */
                        }
            } while ( !(pixcnt&3) || (R&Zmask) || (S&Ymask) );
    } while ( R<resolution && S<resolution );   /* Quit when      */
                                                /*   limit of     */
                                                /*   resolution   */
                                                /*   reached      */
```

In the case of a receiving station that is receiving a data stream from a sending station and performing a concurrent display, the receiving station may cause transmission to be suspended by a suitable exchange of commands with the sending station. The receiving station may then request resumption of the same transmission, termination of the connection, transmission of a different image or a resumption of transmission of a selected sub-area of the image being transmitted. In the latter case, an appropriate exchange of information m st take place before resumption, after which the sending station resumes processing at the point of suspension but thereafter omits transmission of data corresponding to pixels outside the selected sub-area. The receiving station similarly omits reading of any values from the incoming data stream that would correspond to pixels outside the selected sub-area.

Transmission from the sending station may take place as a direct output from the reordering process or, more usually, will simply entail transmission of data from an image pixel map already reordered and stored sequentially as a file. This is a very straightforward operation requiring minimal processing if the entire image is to be transmitted. However, where a selected sub-area of the image is to be transmitted or may be requested, it is necessary for the transmitting station to perform a short program loop very similar to that being performed by the receiving station in order to omit unwanted data.

The method described thus far can achieve a very fast display by writing each pixel as a single point with the pixel attribute values that are attributable to that point in the original image. However, it is frequently the case that the speed with which the image is displayed is limited, not by the processing required at the receiving location, but by the maximum data transmission rate attainable between the sending and receiving stations.

Where images are to be transmitted under such circumstances, the preferred embodiment of the invention includes additional processing steps with the objective of improving the quality of the lower resolution image displayed during the early stages of transmission, and of enabling compaction of the data to accelerate the display, to shorten overall transmission time and to reduce storage requirements.

These additional steps entail display of the image from the reordered data stream as a mosaic of tiles, each tile consisting of a rectangular area of pixels all displaying the same attributes, such that the first tile fills the entire display area, and subsequent tiles overlay existing tiles such that the entire display area is repeatedly overlaid with tiles of a consistent size, before proceeding with tiles of a smaller size, until finally tiles consist of individual pixels.

When the position, (X,Y) for the next valid pixel has been determined and the corresponding attribute value read from the data input stream, that attribute value is written to all display pixels within a rectangular tile, having the pixel (X,Y) at its top left corner, and having dimensions of XDIM in the X-axis and YDIM in the Y-axis, where XDIM and YDIM are determined as follows: If m and n are equal, then XDIM and YDIM are set to the highest power of 2 by which both the X and Y coordinates of that pixel are divisible. If m and n are different, then the value of X or Y corresponding to the smaller of m and n is shifted up by a number of bits equal to the difference between m and n, XDIM and YDIM are set to the highest power of 2 by which both X and Y, shifted as necessary, are divisible, and then the value of XDIM or YDIM corresponding to the smaller of m and n is shifted down by a number of bits equal to the difference between m and n. In the event that this tile would extend beyond the lower or right side of the overall image, the dimensions of the tile are adjusted accordingly. For definitional purposes, the tile thus formed is said to be 'based' on the pixel at (X,Y).

While this method of tiled display can simply replace the pixel-by-pixel method of display with no change in the data stream, it also provides the basis for an effective method of data compaction in cases where the pixel attribute values bear a continuous, monotonic relationship to the actual perception of the displayed pixel. Under these circumstances, multiple pixel values may be averaged to good effect and small errors in pixel attribute values output to the display will not produce unacceptable variations in the display. While this is the case with unmapped grey-scale or color images, it is not typically the case with color-mapped data and therefore, this method of data compaction is unlikely to be effective with color-mapped data.

Using this method of preparation for data compaction, the value of each pixel attribute in the data stream is replaced by the difference between the average value of the original attributes of pixels within the tile based on the said pixel, and the average value of the original attributes of pixels within the larger tile that will be overlaid by the tile based on the said pixel. Then, during display, the appropriate attribute for display of each tile is determined by summing the value of the attribute presently displayed over that tile with the attribute difference value read from the data stream for the said pixel.

As the values representing each pixel are now only differences between adjacent pixel attribute values or between average attribute values of adjacent tiles, which are likely to become smaller as the resolution becomes finer, this data stream lends itself to further compaction by one of a number of recognized methods, such as:

1. Run Length Encoding—effective where large areas of the original image have the same pixel attributes, resulting in long strings of zero differences.
2. Adaptive Pulse Code Modulation—reducing the number of bits used to represent the attribute difference values, with appropriate correction to adjacent values where overflow occurs.
3. Huffman, Landat coding or other variations—because smaller differences are likely to be more prevalent in most images, Huffman coding with or without the use of shift codes may also be effective in compacting the data.

These methods of compaction are suited to this invention as they lend themselves to immediate processing of pixel data. Other methods of image data compaction, which require access to the total image in order to perform the decompaction step are not suitable.

The preferred embodiment tests the compaction provided by each method and utilizes the most effective method for each image. Adaptive Pulse Code Modulation can be utilized in a manner that imposes substantially greater compaction on later segments of the data stream, which represent increasingly finer detail. By imposing a variable limit to the number of bits used to represent each attribute difference value, and lowering this limit at various stages in the data stream, effective compaction can be achieved with relatively little error.

Figure 6:
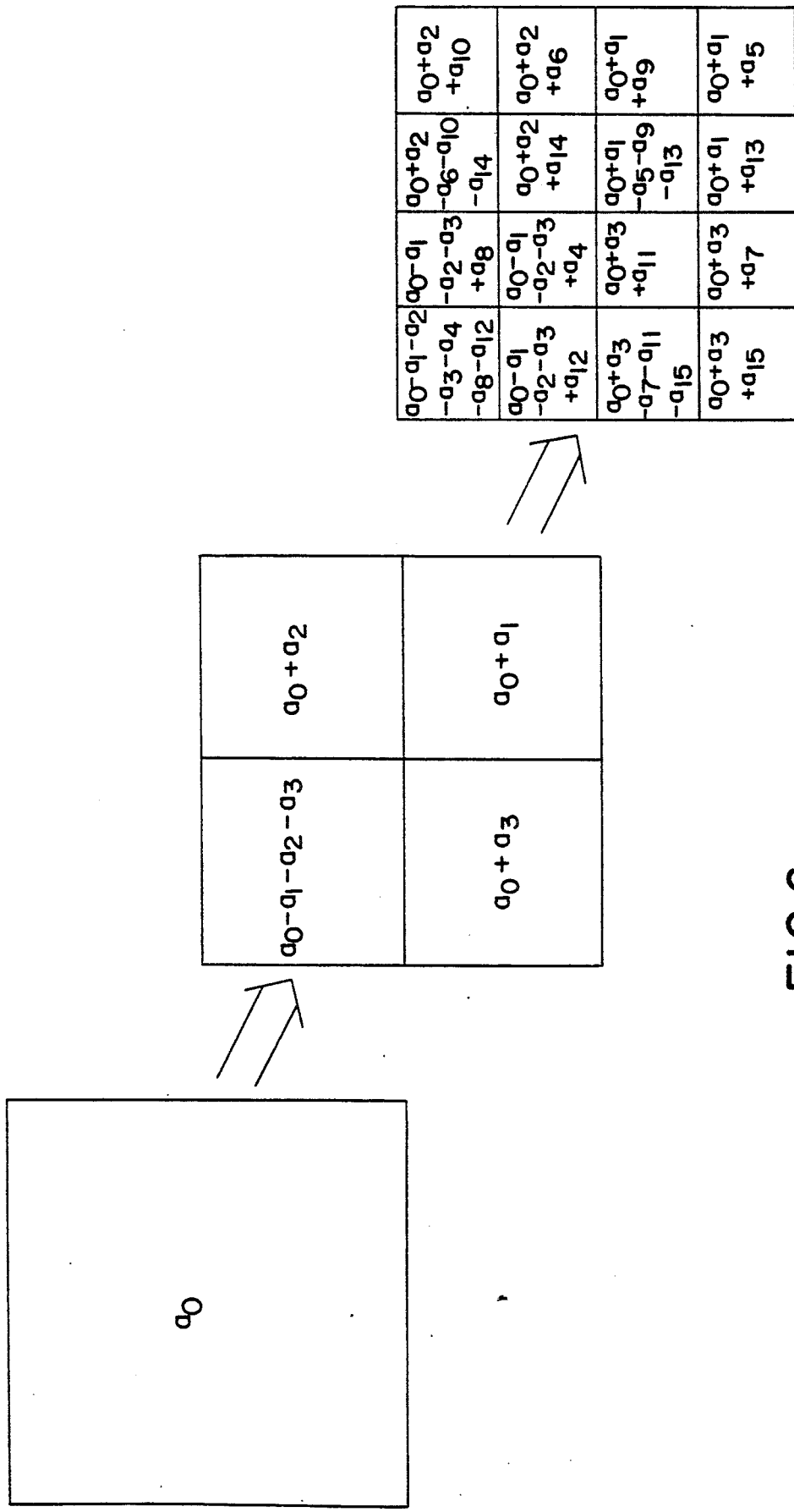
FIG. 6 is a chart showing how pixel attribute values are restored on receipt of compacted data and displayed as a mosaic of tiles in accordance with the present invention.

Referring now to FIG. 6, a method of expanding the compacted data after reception or from storage, and of subsequent display is described: The method of determining the successive pixel coordinates, (X,Y), and the dimensions XDIM and YDIM of the tiles based on each coordinate are as described previously. However, instead of reading a pixel attribute value from the data stream and displaying at the point (X,Y), an attribute difference value is read from the data stream and uncompacted, then added to the attribute value already displayed at the point (X,Y), and that new summed attribute value is displayed at all pixels within the tile. However, as each tile represents the average value of the original attributes of each pixel within that tile, it is necessary to adjust the 'residual' tiles after each round of tiling the entire image with tiles of a given size. The top left corner of each tile in the prior layer remains unchanged and must be corrected by subtracting from it the sum of the difference values used to overlay said tile in the prior layer. In this way, the applied differences will balance out, preserving the overall average attribute values. The completed image will then correctly match the original image, while ensuring that the earlier display provides the closest possible representation of the data received up to that time.

Thus, while the invention has been described with reference to preferred embodiments thereof, it will be understood by those skilled in the art that various changes in form and details may be made without departing from the scope of the invention.

What is claimed is:

1. A computer-implemented method of reordering a pixel map of a multi-dimensional digitized image to provide a new pixel order which approximates to a situation in which any contiguous subset of the reordered pixel map represents all regions of the image, with broader detail being depicted first, followed by increasingly fine detail, the method comprising:

(a) establishing a coordinate system and an origin for that coordinate system which provides for each pixel displacement coordinates represented by a set of positive integer values, each pixel being represented by only one such set of values and each set of coordinate values representing at most one pixel position;

(b) for each pixel in the image:
      (i) establishing attributes of the pixel;
      (ii) establishing a position within the overall image, and representing this position in the form of a set of coordinates relative to the origin;
      (iii) converting each coordinate value in said set of coordinates to a binary repreesentation of 0's and 1's, with the inclusion of leading zeroes to ensure that all representations of that coordinate are of equal length;
      (iv) for each coordinate in the set of coordinates, reversing the bit stream thus formed;
      (v) interleaving the reversed bit streams representing each coordinate in a bit-wise fashion to form a pixel sequence number;

(c) reordering the storage or transmission of the attribute values corresponding to each pixel in the order of ascending pixel sequence numbers.

2. A method according to claim 1, wherein said coordinates are represented by Cartesian coordinates.

3. A method according to claim 1, wherein said image is two-dimensional and said coordinates are represented as (Z,Y) where (X,Y) represents the pixel position within the image in Cartesian coordinates and Z is formed by the bit-wise logical 'EXCLUSIVE OR' of X and Y, discarding those bits, if any, with greater significance than is required to represent all possible values of X.

4. A method according to claim 1, wherein said image is in color with pixel attributes represented by Red/Green/Blue values, Hue/Saturation/Intensity values or other equivalent components.

5. A method according to claim 1, wherein said pixel attributes are represented by an offset into a predefined color map.

6. A method according to claim 1, wherein a random access memory buffer of limited size is utilized to perform efficient reordering of pixel attributes preparatory to transmission or output to a new file.

7. A method according to claim 1, wherein one or more lookup tables are created for performing said reversals of bit-streams.

8. A method according to claim 7, wherein said lookup tables are adjusted to provide scaling of said image to display at resolutions or in perspectives other than that of the original digitized image.

9. A method according to claim 8, further comprising the step of limiting the display to a sub-area of the overall image, by omitting display pixels outside that sub-area.

10. A method according to claim 9, further comprising providing an elastic box superimposed on the display for operator selection of a sub-area of the currently displayed area for enlarged display, or reversion to display the overall image or of a previously displayed area.

11. A method according to claim 9, further comprising wholly or partially clearing said image and adding a new display depicting a different selected sub-area and/or with different scaling.

12. A method according to claim 1, further comprising suspending image transmission from a sending station to a receiving station at any time on request from the receiving station.

13. A method according to claim 12, further comprising following suspension of image transmission, the receiving station requesting continued transmission of a defined sub-area of the overall image, and transmission of such sub-area then proceeds without retransmission of information already received or transmission of information not pertaining to the selected sub-area.

14. A method according to claim 13, further comprising separation of the image into a high definition region and a low definition region and the storage and/or transmission firstly of a recorded pixel map representing the entire image at low definition followed by storage and/or transmission of a reordered pixel map representing only the high definition region at high definition omitting data already included in the first data stream.

15. A method according to claim 1, wherein reordering and subsequent storage or transmission of said pixel map is performed on a digitized image, consisting of separate, contiguous, rectangular sections, each of which is represented by all or a portion of a separate input stream.

16. A method according to claim 1, wherein image files stored as reordered pixel maps are effectively and repeatedly archived by means of a simple truncation of the file with consequent loss of detail, but without total loss of any part of the original image.

17. A method according to claim 1, further comprising displaying said image from the reordered pixel map as a mosaic of tiles, each tile consisting of an area of pixels all displaying the same attributes, the first tile filling the entire display area, and subsequent tiles repeatedly overlaying existing tiles with tiles of a consistent size, before proceeding with tiles of a smaller size, until finally tiles consist of individual pixels.

18. A method according to claim 17, wherein the displayable attributes of each tile are determined to be the average value of the original attributes of the pixels falling within the tile, as read from the original image data stream, and such displayable attributes for each tile are represented in the reordered pixel map by the difference between the value of said displayable attributes and the value of the displayable attributes for the larger previously displayed tile which is to be overlaid by said tile.

19. A method according to claim 18, further comprising the step of compacting the data stream representing the differences in average values of attributes of successive tiles, in a manner that imposes substantially greater compaction on later segments of the data stream, which represent increasingly finer detail and are expected to have, or may be forced to have a smaller range than is present in the earlier segments of the data stream.

20. A method according to claim 1, further comprising storage and/or transmission of image sequences by storing and/or transmitting as much data as is possible in the time available between successive frames and then beginning transmission of the following frame omitting data pertaining to regions of the image that are unchanged relative to the previous frame.

* * * * *